J. F. REYNOLDS.
SHEET METAL WHEEL.
APPLICATION FILED NOV. 13, 1913.
1,185,612.
Patented May 30, 1916.
2 SHEETS—SHEET 1.
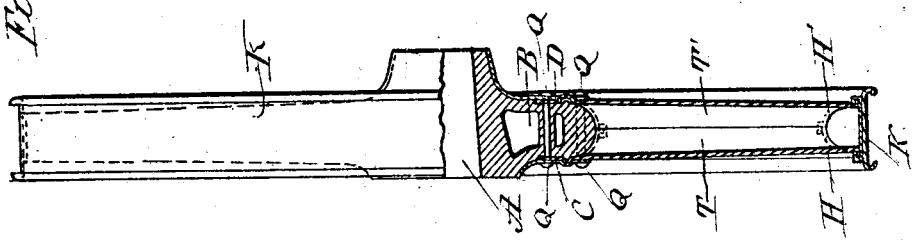
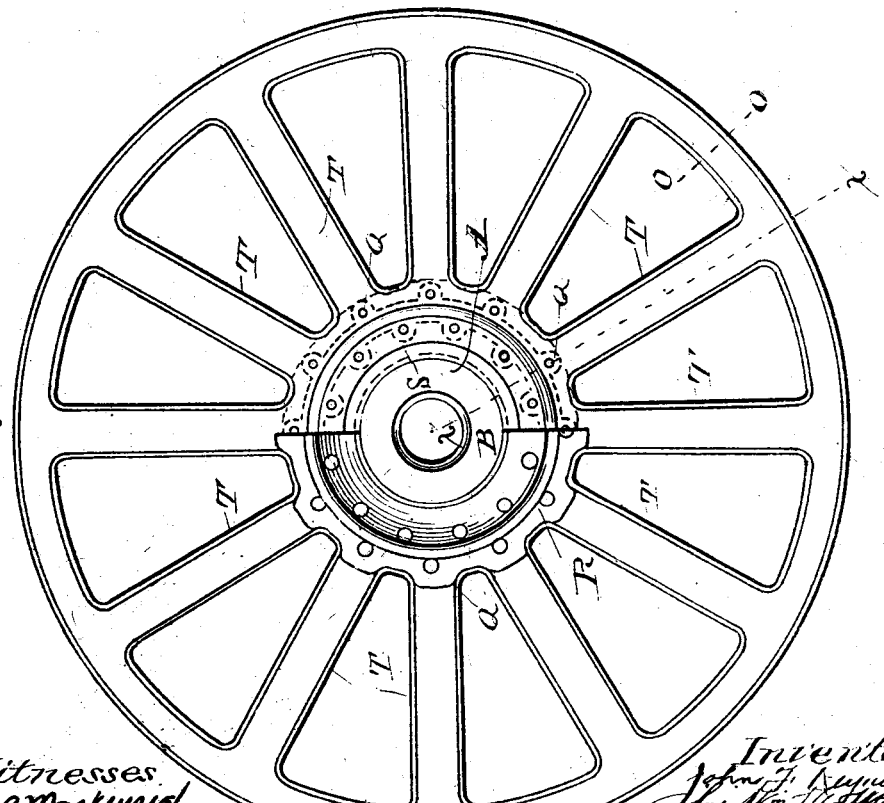

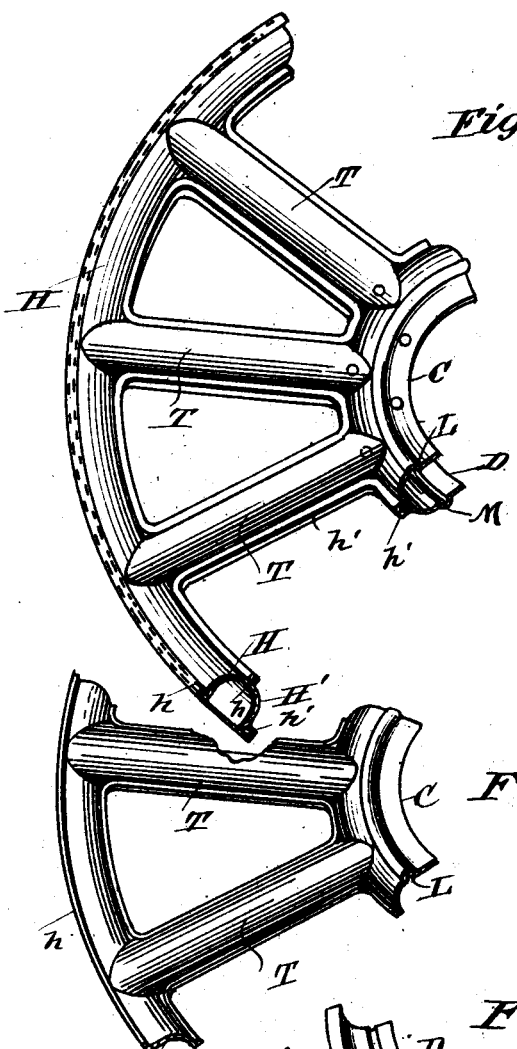

UNITED STATES PATENT OFFICE.

JOHN F. REYNOLDS, OF CLEVELAND, OHIO, ASSIGNOR OF ONE-THIRD TO W. M. OPRE AND ONE-THIRD TO E. A. SMITH, BOTH OF CLEVELAND, OHIO.

SHEET-METAL WHEEL.

1,185,612.   Specification of Letters Patent.   Patented May 30, 1916.

Application filed November 13, 1913. Serial No. 800,847.

*To all whom it may concern:*

Be it known that I, JOHN F. REYNOLDS, a citizen of the United States, and resident of Cleveland, in the county of Cuyahoga and State of Ohio, have invented certain new and useful Improvements in Sheet-Metal Wheels, of which I hereby declare the following to be a full, clear, and exact description, such as will enable others skilled in the art to which it appertains to make and use the same.

The objects of the invention are to provide an entire metal wheel suitable for use with pneumatic or hard rubber tires in automobiles, and trucks, and in which a cast or otherwise constructed metal hub is provided with sheet metal spokes and rim.

Further objects are to provide a form of construction which is simple and combines lightness with strength.

The invention comprises a hollow metal hub and tubular spokes and rim with the forms of construction and means for attaching the different parts together as hereinafter described shown in the accompanying drawings and specifically pointed out in the claims.

In the accompanying drawings Figure 1 is a side elevation partially broken away to show the manner of attaching the spokes to the hub; Fig. 2 is a section of the wheel on line x—x Fig. 1 on an axial plane; Fig. 3 is a cross section of a spoke; Fig. 4 is a cross section through the felly or rim; Fig. 5 is a perspective view of portions of the spokes and rim attached together; Figs. 6 and 7 are similar views of these parts separated from each other.

In these views A represents a hollow hub preferably formed of cast metal, and provided with a hollow annular extension B to which the spokes are attached.

C and D are annular and similar sheet metal members to which the integral halves T and T' of the tubular spokes are integrally secured and integral with the outer extremities of the spokes are shown the half portions H, H' of the rim. These half portions of the spokes are attached together by suitable overlapping edges and as shown in Figs. 2, 3, and 4 the edge of one portion is bent at a right angle at $h$, and the edge of the other portion is so bent at $h'$ as to inclose the edge of the first portion. A metal band I similarly attached to the outer edges of the rim at $h$, $h'$ further secures the parts together and prevents them from spreading apart upon this band or felly rim, the tire holding rim K is sleeved when the wheel is used in automobile work.

The sheet metal members which form the separate halves of the spokes and rim are attached to the hub in the following manner: The separate half portions of the spokes are integrally attached to the common annular central members C and D which overlap the laterally extended portion B of the hub on both sides. Upon each side of this extended portion of the hub is formed an annular rib L and the sheet metal centers C and D are provided with corresponding annular grooves M which engage with said ribs L, L, thus centering the spokes. Shoulders S upon the hub also engage the inner edges of the central members. The ribs L, L receive the thrust of the spokes upon the hub and prevent a sudden blow upon the rim from shearing off the bolts that connect the spokes and hub. The extended portion of the hub is hollow at N and provided with staggered openings P, P for the reception of rivets or bolts Q, Q. Upon the exterior surfaces of the hub the annular flanged plates or disks R, R' are secured, which cover the inner ends of the spokes and central connecting members therefor, and are so shaped as to conform to the shape of the surface of the hub and complete the finished appearance thereof. These outer plates are also provided with annular recesses $r$, $r$, which engage the annular ridges formed upon the spoke centers when the annular recesses mentioned are formed therein. The rivets Q, Q pass through the disks R', R', spoke centers C and D and the lateral extension of the hub and bind the parts securely together. These rivets are arranged in inner and outer series one series upon each side of each annular rib, and hence the sheet metal parts are bound tightly upon said rib. The sheet metal members forming the halves of the rim and spokes, and their common centers, and the flanged disks R, R, can readily be struck out of sheet metal.

Having described the invention what I claim as new and desire to secure by Letters Patent is:

1. In a wheel, a metal hub provided with an annular extension and an annular rib on each side thereof, sheet metal members comprising each a central spoke connecting member and radiating spoke portions and integral rim portions, a band connecting the outer edges of the rim portions together, annular members inclosing the ends of the hub and edges of the spoke connecting members, said annular members and spoke connecting members provided with annular recesses overlapping said annular ribs, on said hub extension, and two series of bolts passing through said hub extension and annular members, one series on each side of said annular rib.

2. In a wheel, a metal hub, duplicate sheet metal portions including spoke portions, central spoke connecting portions and integral rim portions, said sheet metal portions having interlocking edges, annular members sleeved over the ends of said hub, and overlapping said spoke connecting portions, said hub provided with an annular extension and an annular rib on each side thereof, and said sheet metal spoke connecting portions and overlapping annular members provided with annular recesses corresponding to said annular ribs, upon said hub, and bolts passing through said spoke connecting portions, annular members and hub, substantially as described.

In testimony whereof, I hereunto set my hand this 25th day of August 1913.

JOHN F. REYNOLDS.

In presence of—
L. I. LITZLER,
WM. M. MONROE.